United States Patent

Woltjer et al.

[11] Patent Number: 6,152,288
[45] Date of Patent: Nov. 28, 2000

[54] HIGH VOLUME STORAGE SYSTEM WITH POWER AND FREE DRIVE

[75] Inventors: Bernard H. Woltjer, Jension; Dennis J. Schuitema, Ada, both of Mich.

[73] Assignee: Mannesmann Dematic Rapistan Corp., Grand Rapids, Mich.

[21] Appl. No.: 09/042,986

[22] Filed: Mar. 17, 1998

Related U.S. Application Data

[60] Provisional application No. 60/041,164, Mar. 20, 1997.

[51] Int. Cl.[7] .............................. B65G 17/42; B65G 1/10
[52] U.S. Cl. .................................. 198/465.4; 198/687.1; 198/867.01; 198/867.15; 414/331
[58] Field of Search ........................... 198/687.1, 465.4, 198/867.01, 867.15; 414/331

[56] References Cited

U.S. PATENT DOCUMENTS

| | | |
|---|---|---|
| 1,718,512 | 6/1929 | Wright et al. . |
| 1,837,605 | 12/1931 | Baker . |
| 1,856,498 | 5/1932 | Miller . |
| 2,551,080 | 5/1951 | Allen et al. ............................. 198/19 |
| 2,604,970 | 7/1952 | Ssteinhoff ............................. 198/19 |
| 2,634,851 | 4/1953 | Steinhoff ............................... 198/19 |
| 2,671,552 | 3/1954 | Miller .................................. 198/110 |
| 2,716,478 | 8/1955 | Wehmiller et al. ................... 198/19 |
| 2,789,683 | 4/1957 | Stahl ..................................... 198/110 |
| 3,148,785 | 9/1964 | Fauconnier ......................... 214/16.1 |
| 3,180,279 | 4/1965 | Thibault . |
| 3,256,970 | 6/1966 | Fievet ...................................... 198/19 |
| 3,595,368 | 7/1971 | Mantovani ............................ 198/25 |
| 3,627,110 | 12/1971 | Lichti .................................... 198/155 |
| 3,630,502 | 12/1971 | Schmidt ................................ 263/28 |
| 3,661,284 | 5/1972 | Traube ................................. 214/152 |
| 3,670,867 | 6/1972 | Traube ................................... 198/38 |
| 3,780,852 | 12/1973 | Weiss et al. ......................... 198/181 |
| 3,792,785 | 2/1974 | Wier .................................... 214/16.4 |
| 4,088,237 | 5/1978 | Brown .................................. 214/152 |
| 4,171,739 | 10/1979 | Yamato ................................. 198/704 |
| 4,379,602 | 4/1983 | Iemura et al. ....................... 312/268 |
| 4,389,157 | 6/1983 | Bernard, II et al. ................. 414/787 |
| 4,422,554 | 12/1983 | Lichti .................................... 211/1.5 |
| 4,574,962 | 3/1986 | Tabler et al. ........................ 211/122 |
| 4,735,032 | 4/1988 | Focke ..................................... 53/149 |
| 4,750,607 | 6/1988 | Focke ................................... 198/792 |
| 4,821,888 | 4/1989 | Hankes ................................. 211/105 |
| 4,838,036 | 6/1989 | Norrie ................................ 198/465.4 |
| 4,842,121 | 6/1989 | Michalon ............................. 198/334 |
| 4,887,809 | 12/1989 | Eberle .................................. 271/203 |
| 4,890,718 | 1/1990 | Colamussi ........................ 198/465.3 |
| 4,968,207 | 11/1990 | Lichti .................................. 414/331 |
| 4,983,091 | 1/1991 | Lichti, Sr. et al. .................. 414/331 |
| 5,197,844 | 3/1993 | Lichti, Sr. et al. .................. 414/331 |
| 5,226,524 | 7/1993 | Guttinger ......................... 198/343.2 |

(List continued on next page.)

FOREIGN PATENT DOCUMENTS

| | | |
|---|---|---|
| 272340 | 6/1988 | European Pat. Off. . |
| 1427294 | 4/1966 | France . |
| 2725416 | 4/1996 | France . |
| 1259779 | 2/1966 | Germany . |
| 1937455 | 1/1970 | Germany . |
| 48306 | 3/1984 | Japan . |
| 223605 | 12/1984 | Japan . |
| 252031 | 11/1986 | Japan . |

(List continued on next page.)

*Primary Examiner*—Christopher P. Ellis
*Assistant Examiner*—Mark A. Deuble
*Attorney, Agent, or Firm*—Van Dyke, Gardner, Linn & Burkhart, LLP

[57] ABSTRACT

An active high volume storage carousel provides an improved drive system. The carousel includes a driven conveyor, which defines a continuous path and includes at least one container handling location along the continuous path. A track rail extends around the continuous path and provides vertical support for a plurality of storage columns, which are drivingly coupled to the conveyor by couplers. When the storage columns are moved through the container handling location, at least one of the storage columns is drivingly decoupled from the driven conveyor so that the decoupled storage column can be easily loaded with or unloaded of containers.

57 Claims, 10 Drawing Sheets

U.S. PATENT DOCUMENTS

| | | | |
|---|---|---|---|
| 5,237,510 | 8/1993 | Kakizawa et al. | 364/478 |
| 5,246,332 | 9/1993 | Bernard, II et al. | 414/786 |
| 5,505,586 | 4/1996 | Lichti | 414/786 |
| 5,769,949 | 6/1998 | Cienkus et al. | 198/687.4 |
| 5,806,657 | 9/1998 | Enderlein et al. | 198/687.1 |

FOREIGN PATENT DOCUMENTS

| | | |
|---|---|---|
| 48085 | 7/1991 | Japan . |
| 286559 | 11/1993 | Japan . |
| 449198 | 4/1968 | Switzerland . |
| 1133185 | 1/1985 | U.S.S.R. . |
| 962477 | 10/1961 | United Kingdom . |

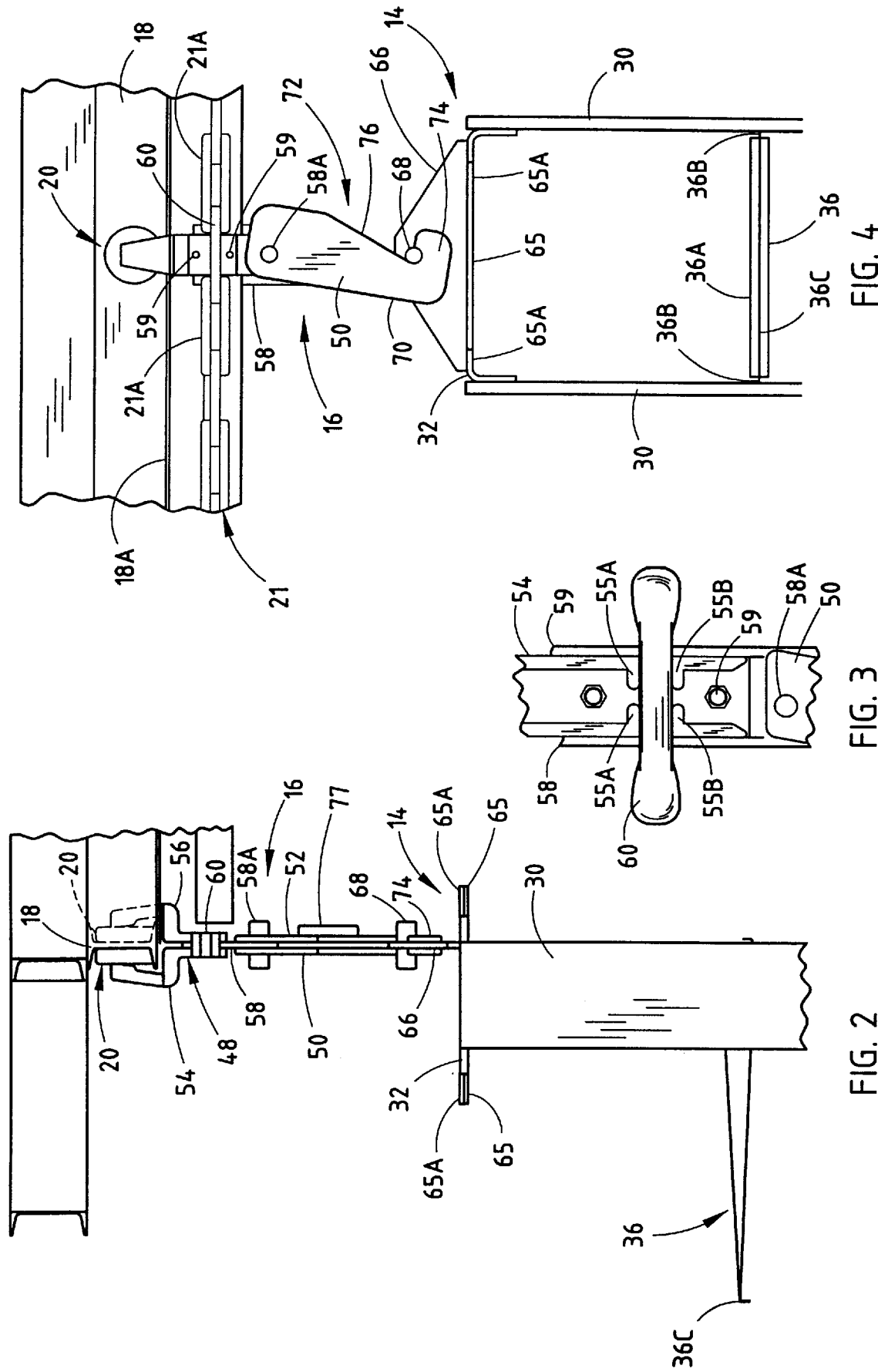

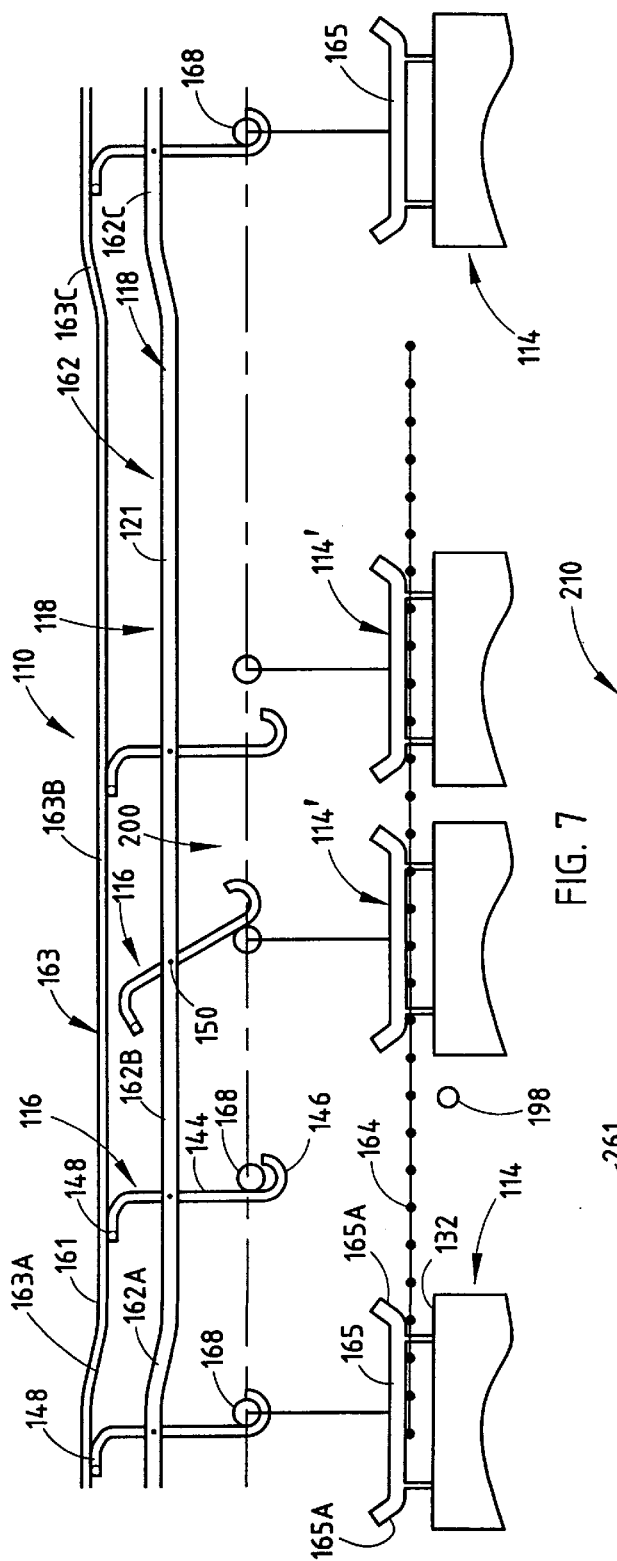
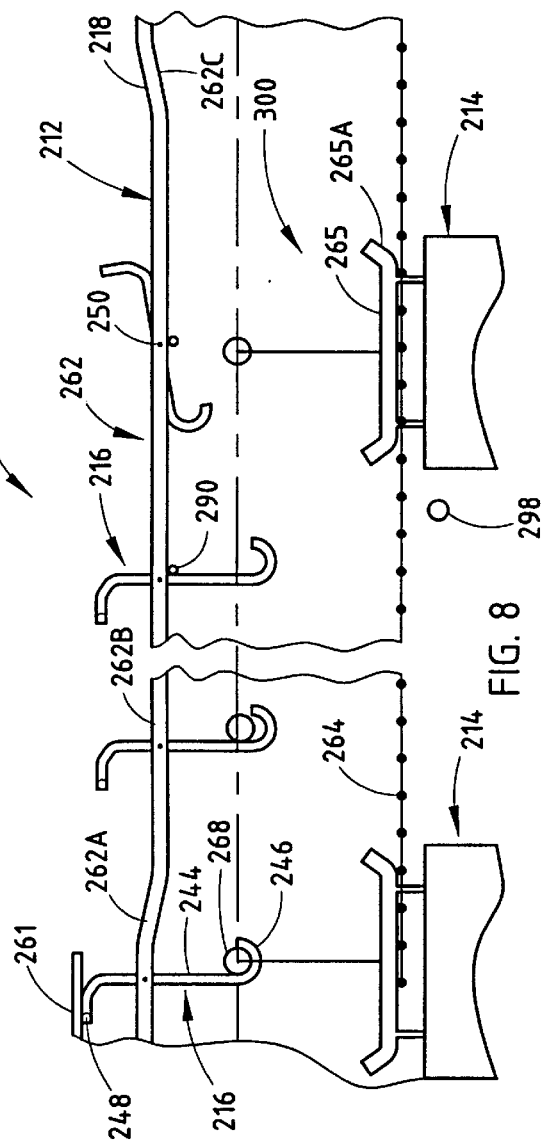
FIG. 7
FIG. 8

HIGH VOLUME STORAGE SYSTEM WITH POWER AND FREE DRIVE

This is a non-provisional application which claims priority from the provisional application entitled HIGH VOLUME STORAGE SYSTEM WITH POWER AND FREE DRIVE Ser. No. 60/041,164, filed on Mar. 20, 1997.

BACKGROUND OF THE INVENTION

The present invention relates generally to a storage system for use in a warehouse. More particularly, the invention relates to a high volume storage carousel.

Conventional high volume storage carousels generally fall into two categories: continuously moving carousels and indexing carousels. Continuously moving carousels include a plurality of storage columns that are suspended on and driven by a conveyor. To avoid interferences between containers being delivered to or retrieved from the carousel and containers stored on adjacent storage columns, the storage columns are oversized by a distance equal to the distance traveled by a storage column during the period of time that it takes to unload or load the storage column. This extra spacing reduces the number of storage columns on a carousel and, therefore, reduces the storage capacity of the carousel. Furthermore, since the storage columns are continuously moving, the retrieval and delivery equipment must be able to operate quickly and are, therefore, typically designed to grab the containers rather than push the containers. To minimize damage to the containers, most continuously moving carousels store the containers in totes, which are grabbed by the retrieval and delivery equipment; these totes, however, restrict the size of the containers that can be stored on the storage carousel. Moreover, the retrieval and delivery equipment tends to be relatively complicated.

In U.S. Pat. No. 4,983,091 to Lichti, Sr. et al., a "toteless" continuously moving storage carousel is disclosed. Like the other continuously moving carousels, the Lichti carousel requires the individual storage columns to be spaced apart a distance equal to the distance traveled by a storage column during a retrieval or delivery cycle. The containers are transferred to the carousel by a shuttle which includes supporting arms. In order to accommodate the supporting arms, the shelves of the storage columns have irregular side edges. These irregular side edges permit the supporting arms of the shuttle to slide under the container and lift the container supported thereon off the shelf without traversing the shelf. However, these irregular side edges and supporting arms tend to restrict the size of the packages that can be stored on the carousel.

On the other hand, indexing carousels include a drive conveyor that stops and starts so that the storage columns can be moved one by one to a delivery or retrieval location where the individual storage columns are stopped for loading with or unloading of containers. While indexing carousels generally provide more storage space than continuously moving carousels, stopping and starting these indexing carousels requires a great amount of energy and exerts a significant strain on the system and the individual parts of the carousel-moving carousels tend to be large, typically weighing up to 90,000 pounds.

Therefore, there is a need for a storage carousel that can provide the increased storage capacity associated with indexing carousels and the advantages of loading or unloading on to a relatively stationary storage rack and yet does not require the expenditure of energy or the increased maintaince associated with indexing carousels.

SUMMARY OF THE INVENTION

The present invention provides an improved active high volume storage carousel which includes a power and free drive system.

In one aspect of the invention, the active high volume storage carousel includes a driven conveyor defining a continuous path and a track rail, which extends around the continuous path. A plurality of storage columns are each coupled to the conveyor and supported and guided on the track rail by a coupler. When the storage columns are moved to a container handling location on the continuous path, at least one of the storage columns is temporarily, drivingly decoupled from the conveyor so that it can be slowed or stopped for loading with or unloading of containers.

The couplers may include a pivotal hook member for engaging the storage columns. To decouple a storage column from the conveyor, the pivotal hook member of a coupler is pivoted to disengage from its respective storage column when its respective storage column is moved to the container handling location. The carousel may also include a decoupler for pivoting the hook member. Vertical support for the decoupled storage column may be provided by a support, such as a support rail or a conveyor. Preferably, the decoupled storage column is accelerated or advanced along the support ahead of its respective coupler where it remains generally stationary during a loading and unloading cycle after which a respective coupler, driven by the conveyor, recouples the stationary storage column to the conveyor.

In another aspect, the support may include bearings to support the storage column when it is decoupled from the chain. The storage column is preferably advanced along the support on the bearings and held substantially stationary in the holding position where the decoupled storage column can be loaded with or unloaded of containers.

In other aspects, each of the couplers includes a plurality of bearings for engaging its respective storage column. When a storage column is moved to the container handling location, the storage column is advanced on the bearings of its respective coupler from a driving position to a holding position on the coupler. In the holding position, the storage column is drivingly decoupled from the coupler and the conveyor and defines a substantially stationary storage column for loading or unloading. After loading or unloading, its respective coupler, driven by the conveyor, moves with respect to the stationary storage column to return the storage column back to the driving position on the coupler, where the storage column is then recoupled to its respective coupler and to the conveyor.

In another aspect, the storage carousel may include a storage column driver and a stop. The driver advances the decoupled storage column along the coupler to move the storage column from the driving position to the holding position. Once in the holding position, the stop holds the storage column relatively stationary while its respective coupler is moved by the driven conveyor relative to the stationary storage column, thus returning the storage column to the driving position, where it is recoupled to its coupler and to the conveyor.

According to another aspect of the invention, an active high volume storage carousel includes a driven conveyor and a plurality of storage columns, with each of the storage columns coupled to the driven conveyor at respective locations on the conveyor. The driven conveyor moves the coupled storage columns in a continuous path. A decoupler is provided that temporarily decouples a group of the storage columns from the driven conveyor at a container handling location so that the decoupled storage columns can be easily unloaded of or loaded with containers. A support may be positioned in the container handling location and aligned in the continuous path so that the driven conveyor will move the group of storage columns on to the support while the decoupler decouples the storage columns from the driven conveyor to thereby provide vertical support for the decoupled storage columns.

In one aspect, the decoupler may comprise a stationary abutment positioned in the container handling location along the continuous path. As the conveyor moves the storage columns and its respective couplers to the container handling location, the abutment disengages the couplers from their respective storage column and thereby decouples the storage columns from the conveyor.

According to yet another aspect of the invention, a method of handling a plurality of storage columns on a moving carousel includes driving the plurality of storage columns in a continuous path around the carousel in a substantially continuous motion and temporarily slowing at least one of the storage columns in a container handling location along the continuous path in order to load containers onto or unload containers from the at least one substantially stationary storage column while continuing to drive the remaining storage columns in the continuous path.

In one aspect, a group of storage columns is temporarily slowed in the container handling location. Preferably, the group of storage columns are accelerated along the continuous path to the container handling location and held substantially stationary in the container handling location during a container handling cycle so that at least one of the storage columns can be loaded with containers or unloaded of containers while the group of storage columns are substantially stationary.

In another aspect, the individual storage columns of the group of storage columns are decoupled from the conveyor during a container handling cycle and are recoupled to the conveyor after the container handling cycle. The storage columns may be decoupled from their respective couplers, or the couplers may be decoupled from their respective storage columns to thereby decouple the group of storage columns from the conveyor.

As will be understood, the active high volume storage carousel of the present invention provides numerous advantages over prior known carousels. By individually decoupling one or more storage columns from the conveyor, which drives the storage columns in a continuous path, the space between each storage column can be minimized to thereby maximize the storage capacity of the carousel. Furthermore, the carousel of the present invention offers all the advantages of an indexing carousel but without the energy requirements and wear and tear associated with the indexing carousels. Moreover, by substantially slowing or completely stopping a storage column the transfer devices that are used to deliver containers to and retrieve containers from the stationary storage column can be simplified. Further, as the transfer of articles/containers from the conveyor to a lift assembly and from a lift assembly to the carousel can be accomplished with pushers, the need for intermediate carriers, such as totes or pallets, is eliminated and the efficiency of the system is increased with respect to speed and scope.

These and other objects, advantages, purposes and features of the invention will become more apparent from a study of the following description taken in conjunction with the drawings.

BRIEF DESCRIPTION OF THE DRAWINGS

FIG. 2 is an enlarged partial front elevational view of the storage column and a storage column coupler;

FIG. 3 is an enlarged detailed view of the coupler connection to the conveyor;

FIG. 4 is an enlarged partial side elevational view of the storage column and the storage column coupler;

FIG. 7 is partial front elevational view of a second embodiment of the coupler assembly;

FIG. 8 is partial front elevational view of a third embodiment of the coupler assembly;

DETAILED DESCRIPTION OF THE PREFERRED EMBODIMENTS

Figure 1:
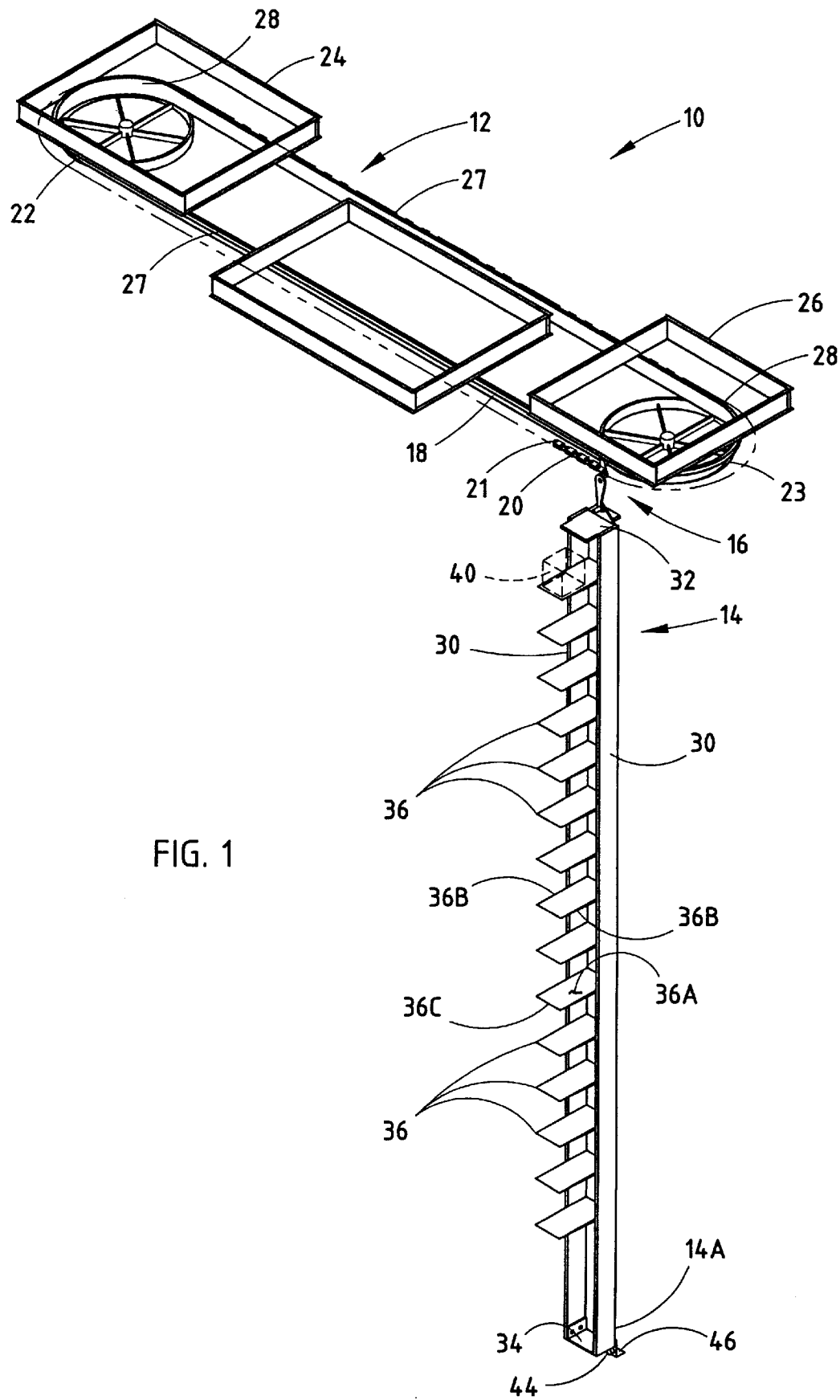
FIG. 1 is a partial perspective view of the active high volume storage carousel of FIG. 1 with a storage column coupled to a conveyor of the storage carousel.

Referring now specifically to the drawings and the illustrative embodiments depicted therein, the numeral 10 generally designates an active high volume storage carousel, which comprises a power and free carousel. As best seen in FIG. 1, storage carousel 10 includes a horizontally traveling endless overhead conveyor 12 that defines a continuous path around the carousel and a plurality of storage columns 14 (only one shown in this view) that are each suspended from and coupled to conveyor 12. Each storage column 14 is coupled to conveyor 12 by a coupler assembly 16 and driven around the continuous path by the conveyor on a continuous track rail 18 on bearing assemblies 20, which are mounted to coupler assembly 16.

Conveyor 12 includes an endless linkage 21 and a pair of end wheels 22 and 23 that move endless linkage 21 around its continuous path. Endless linkage 21 preferably comprises an endless chain, such as a chain which is commercially available from Webb-Stiles Co. Of Valley City, Ohio. Common sizes are 228 (2" pitch), 348 (3" pitch), 458 (4" pitch), and 678 (6" pitch). End wheels 22 and 23 and conveyor drivers (not shown) are supported on support frames 24 and 26. Support frames 24 and 26 may comprise fixed or floating frames, which are also available from Webb-Stiles Co. Rail 18 preferably comprises a structural beam, such as an I-beam, and is secured to the underside of support frames 24 and 26 by conventional methods, such as welding, bolting, riveting or the like. Rail 18 includes a pair of parallel straight side track sections 27 and opposed end track sections 28 to provide continuous support for storage columns 14 as columns 14 are moved around the continuous path by conveyor 12. As best seen in FIG. 1, track rail 18 may have semi-circular end sections 28, but it should be understood that the end sections 28 may be curved with flared portions, for example a "dog-bone" shaped end. This depends on whether carousel 10 is to be loaded and unloaded from the sides or from the ends of the carousel. For examples of loading and unloading equipment that can be used with carousel 10, reference is made to pending patent application entitled HIGH VOLUME CONVEYOR ACCUMULATOR FOR WAREHOUSE filed on Nov. 5, 1996, Ser. No. 08/746,017, which is incorporated herein in its entirety by reference, now U.S. Pat. No. 5,860,784.

Each storage column 14 includes a pair of spaced side members 30 and upper and lower members 32 and 34, which respectively extend between and are secured to side members 30 by conventional fastening methods, such as bolting, welding, riveting or the like. A plurality of vertically spaced storage shelves 36 extend between side members 30 and are similarly secured to side members 30 by conventional fastening methods, such as bolting, welding, riveting or the like. Shelves 36 provide storage space for articles/containers 40 (shown in phantom), which are to be stored on carousel 10, and extend over the full extent of the space between side members 30. Storage columns 14 are arranged in a side-by-side relationship on conveyor 12 so that the respective shelves 36 form a plurality of vertically spaced horizontal tiers, with relatively small gaps between each adjacent shelf 36. Shelves 36 may comprise solid sheet metal trays with generally horizontal, planar support storage surfaces 36a. Preferably, shelves 36 provide smooth storage surfaces 36a that accommodate a wide range of article/container shapes and sizes. More preferably, storage surfaces 36a are free of discontinuities, such as holes or irregular surfaces, to reduce the risk of package jams. Most preferably, storage shelves 36 each include generally parallel, straight side edges 36b to minimize the gaps/distance between adjacent support surfaces 36a and have a distal free edge 36c to permit containers 40 to slide onto shelves 36 with minimal force and minimal risk of jamming.

As best seen in FIGS. 2 and 4, each storage column 14 is individually coupled to endless linkage 21 of conveyor 12 by a coupler assembly 16. As described previously, each coupler assembly 16 includes a pair of bearing assemblies 20, such as rollers or wheels, for engaging lower flanges 18a of rail 18. Rail 18 provides vertical support to and guides storage columns 14 as they are driven around the continuous path by conveyor 12. Each storage column 14 further includes a lower bearing assembly 44, such as a roller or wheel, adjacent a lower end 14a for engaging a second rail 46, which is disposed below overhead conveyor 12 and, preferably, close to ground level. In this manner, second rail 46 provides lateral support for each storage column 14 and resists the moments that result from the eccentric loading of the individual storage columns. As best seen in FIG. 1, when storage shelves 36 are loaded with containers, the center of gravity of the containers may be offset from the centroid of the storage column and, therefore, induce a moment force about its pin connection to the endless linkage 21. Second rail 46 provides a lateral support, which counteracts that moment force to keep the storage columns from rotating about their pinned connections to coupler assemblies 16, which will be more fully described below.

Referring to FIGS. 2–4, each coupler assembly 16 includes a trolley member 48 for engaging rail 18 and a pair of hook members 50 and 52 for releasably coupling to a respective storage column 14. Trolley member 48 includes a pair of arms 54, 56 on which bearing assemblies 20 are rotatably mounted. Trolley member 48 is commercially available from Webb-Stiles Company of Valley City, Ohio. Positioned and held between arms 54, 56 of trolley member 48 is an attachment plate 58 onto which hook shaped members 50, 52 are respectively mounted by a pin 58a to pivotally couple hook shaped members 50, 52 to trolley member 48. Arms 54, 56 are bolted together, with plate 58 held therebetween, by bolts 59, which extend through bolts holes provided in arms 54, 56 and in attachment plate 58. Trolley member 48 further includes a rigid link member 60 for extending between and coupling to respective links 21a of endless linkage 21 so that each coupler assembly 16 is coupled to endless linkage 21. Link member 60 is seated on arms 54, 56 between two sets of shoulders 55a and 55b, which retain link member 60 on arms 54, 56 (FIG. 3). In this manner, when endless linkage 21 is driven by the conveyor drivers, coupler assemblies 16 are driven around the continuous loop defined by endless linkage 21 and guided along rail 18 by bearing assemblies 20.

Figure 5A:
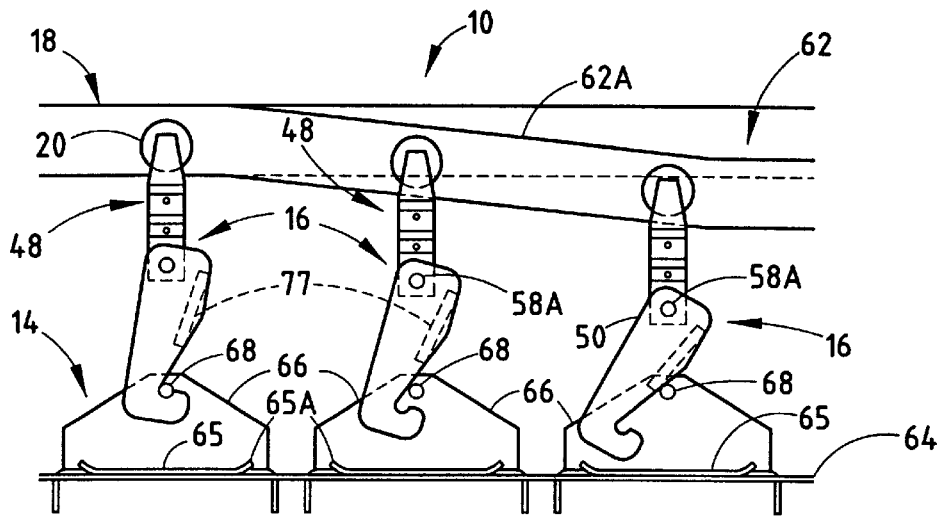
FIGS. 5A–5C are partial front elevational views of a plurality of storage columns in a sequence where at least one storage column is temporarily decoupled from the conveyor and recoupled to the conveyor.
Figure 5B:
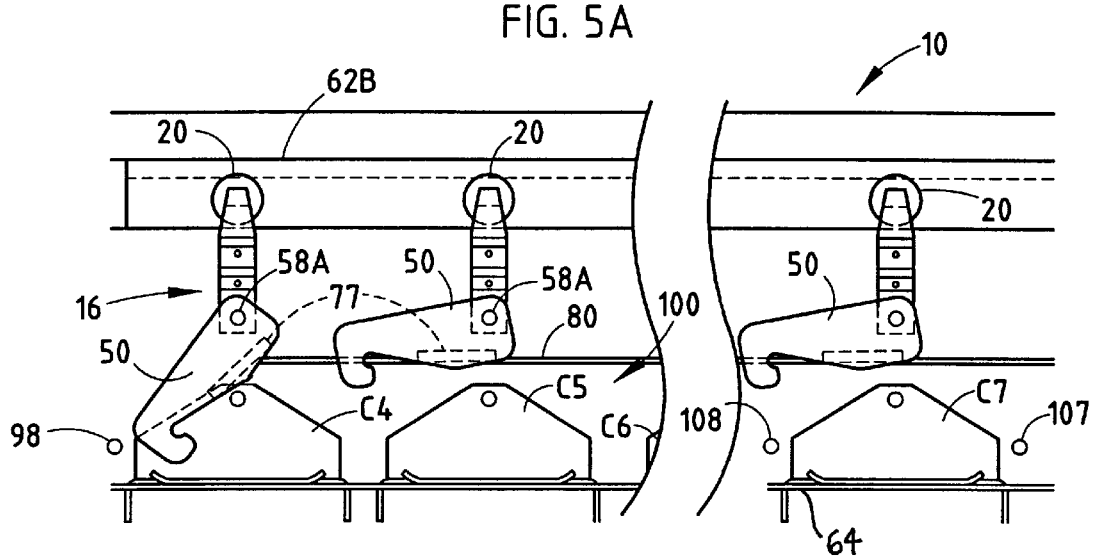
Figure 5C:
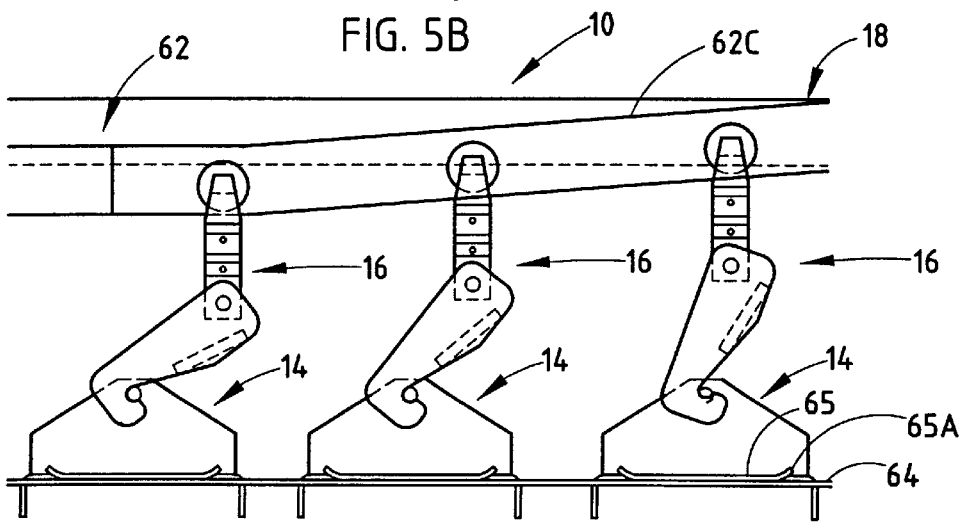

Coupler assembly 16 is adapted to decouple from its respective storage column 14 so that the decoupled storage column (14') can be temporarily slowed or stopped for loading containers 40 to and unloading containers 40 from its shelves 36. As best seen in FIGS. 5A–5C, track rail 18 includes an offset portion 62, and carousel 10 includes a support rail 64. Offset portion 62 includes a ramp-down section 62a, an intermediate holding section 62b, and a ramp-up section 62c. As storage column 14 is moved around the continuous path by conveyor 12 and approaches offset portion 62 of track rail 18, storage column 14 is guided onto support rail 64 by support flanges 65, which extend laterally outward from upper member 32 of column 14. Support flanges 65 include upwardly sloping forward and rearward portions 65a to guide storage column 14 onto support rail 64 as storage column 14 is driven by conveyor 12. Preferably, support rail 64 has low friction bearing surfaces, such as cam followers, rollers, bearings, or UHMW material (ultra high molecular weight) available from INA Bearings or any plastic supplier. While storage column 14 is supported on support rail 64, ramp-down section 62a lowers coupler assembly 16 relative to storage column 14 to decouple hook members 50 and 52 from storage column 14 as will be more fully described below.

As best seen in FIGS. 2 and 4, storage columns 14 each include an attachment plate bracket 66, which extends upwardly from upper member 32 for coupling to its respective coupler assembly 16. Attachment plate bracket 66 includes a transverse pin 68 that extends through attachment plate bracket 66 to project outwardly from both sides of bracket 66 for engagement by hook members 50 and 52. Referring to FIG. 4, each hook member 50, 52 preferably comprises a generally rectangular plate 70 having a cut-out section 72 to form a reverse J-shaped hook portion 74 for engaging pin 68 of its respective storage column 14. Leading edges 76 of cut-out section 72 provide camming surfaces. As coupler assembly 16 is lowered by ramp-down portion 62a, the downward movement of hook members 50, 52 causes pin 68 to engage camming surfaces 76 of hook members 50, 52, which induces rotation of hook members 50, 52 about pin 58a. Furthermore, hook member 52 includes a camming member 77, such as an angled plate or flange, that projects from plate 70 to provide a second camming device. As coupler assemblies 16 are driven along holding section 62b of rail 18, camming members 77 make contact with a stationary abutment 80, such as a rail, which induces further rotation of hook members 50 and 52 about pin 58a as abutment 80 pushes and slides along camming members 77. In this manner, hook members 50 and 52 are rotated sufficiently to raise hook portions 74 above attachment plate bracket 66 of its respective decoupled storage column 14' so that the decoupled storage column can be advanced to an upstream coupler assembly 16.

It should be understood that when hook members 50, 52 are engaged with a pin (68) of a storage column (14), the respective storage column (14) is driven around the continuous path by endless linkage 21 and guided along rail 18 by bearing assemblies 20. On the other hand when hook members 50, 52 are decoupled from storage column 14, storage column is freed from the continuous chain linkage 21 and no longer powered by conveyor 12. Preferably, one or more decoupled storage columns (14') is advanced along support rail 64 by a storage column driver 98 to a holding or container handling location 100, as will more fully described in reference to FIGS. 6A–6H. Driver 98 may comprise a friction drive, a push drive, or a chain drive.

The process of delivering containers to and retrieving containers from a set of storage columns 14 by temporarily decoupling a group of storage columns (14') from conveyor 12 and recoupling the decoupled storage columns (14') to the conveyor once the loading and unloading cycle is finished is best seen in FIGS. 6A–6L. To better understand, these figures should be reviewed in combination with FIGS. 5A–5C.

As best shown in FIG. 5A, as storage columns 14 approach the container handling location 100, storage columns 14 are driven onto support rail 64 on their support flanges 65 and their respective coupler assemblies 16 are guided along down-ramp portion 62a, which lowers coupler assemblies 16 with respect with their associated storage columns 14. As described previously, the coupler assemblies 16 are then decoupled from their respective storage columns (14) by a decoupler, in the illustrated embodiment by stationary abutment 80. Once storage columns 14 are supported on support rail 64, driver 98 accelerates or advances a group of decoupled storage columns (14') along support rail 64 to align two of the decoupled storage columns (14') with support shelves 102a and 102b of lift 102. A retractable stop 107 may be positioned in the container handling location and extended into the path of the decoupled storage columns 14' to stop the accelerated decoupled storage columns in the handling location so that they are aligned with lift 102. After the decoupled storage columns are aligned with lift 102, stop 107 may be retracted from the path of the storage columns. As described above, in order to avoid interference between hook members 50, 52 and their respective storage column member's attachment plate bracket 66 when the decoupled storage columns 14' are advanced to the next upstream coupler assembly 16, stationary abutment 80 engages camming member 77 of each approaching coupler assembly 16 (FIG. 5B) to further rotate the respective hook members 50 and 52 about their pins 58a. As coupler assemblies 16 are pulled alongside abutment 80 by conveyor 12 over intermediate or holding section 62b of rail 18 (FIG. 5B) their respective decoupled storage columns 14' are loaded and unloaded at container handling location 100. It should be noted that the lengths of support rail 64 and stationary abutment 80 are determined based on the number of storage columns that are to be decoupled and, therefore, may vary within a wide range of dimensions to accommodate the different combinations of loading and unloading stations.

Figure 6A:
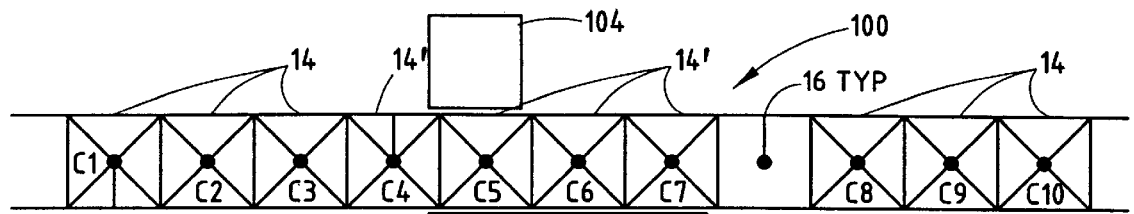
FIG. 6A–6L are a sequence of schematic views of the storage columns as they are decoupled and recoupled to the conveyor.
Figure 6B:
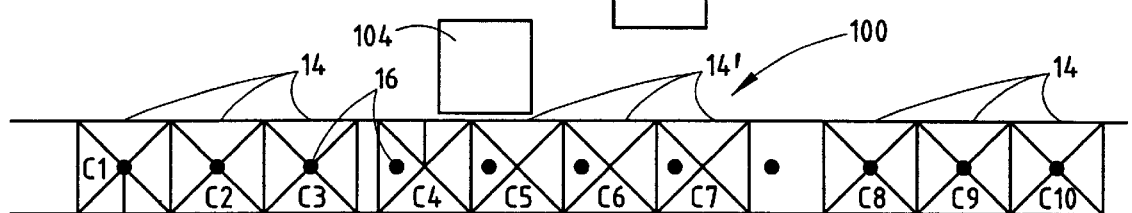
Figure 6C:
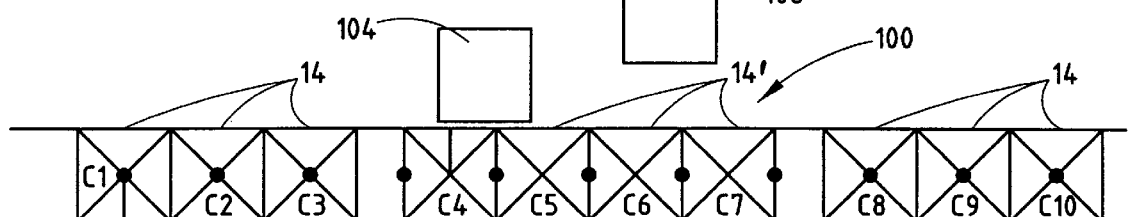
Figure 6D:
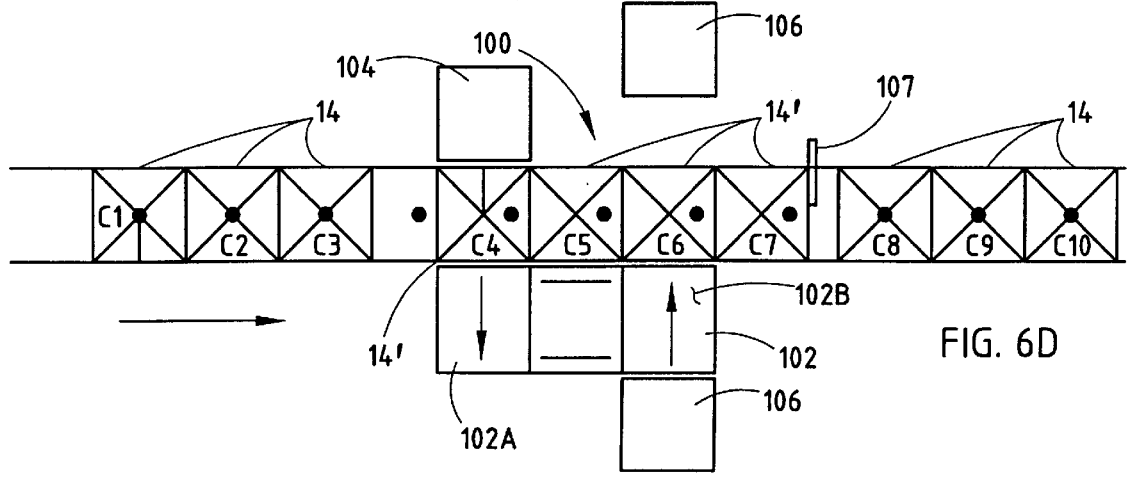
Figure 6E:
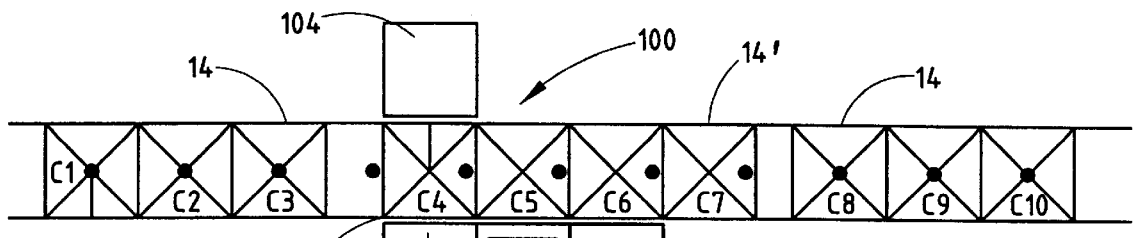
Figure 6F:
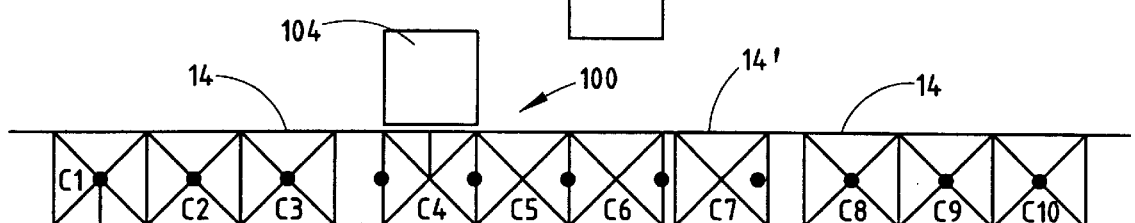
Figure 6G:
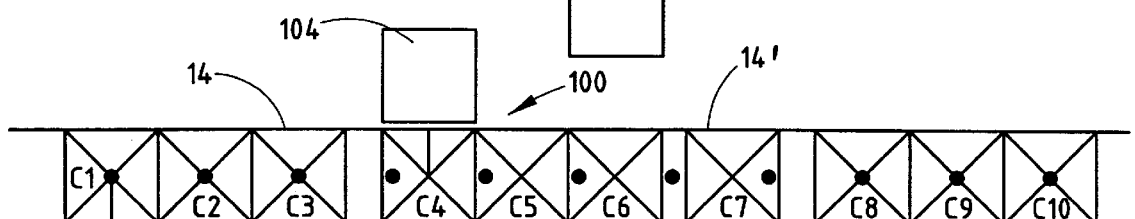
Figure 6H:
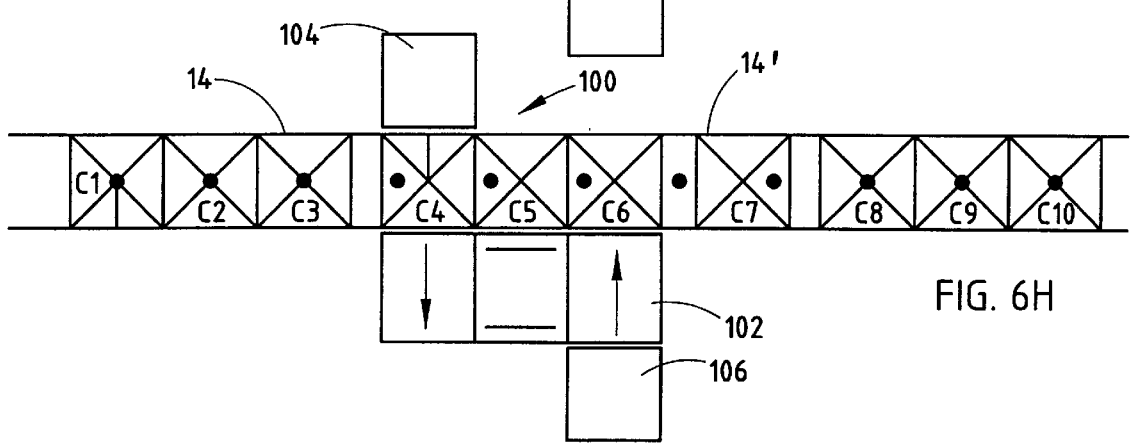
Figure 6I:
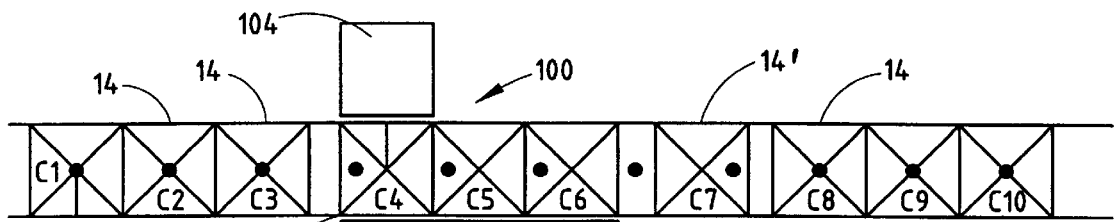
Figure 6J:
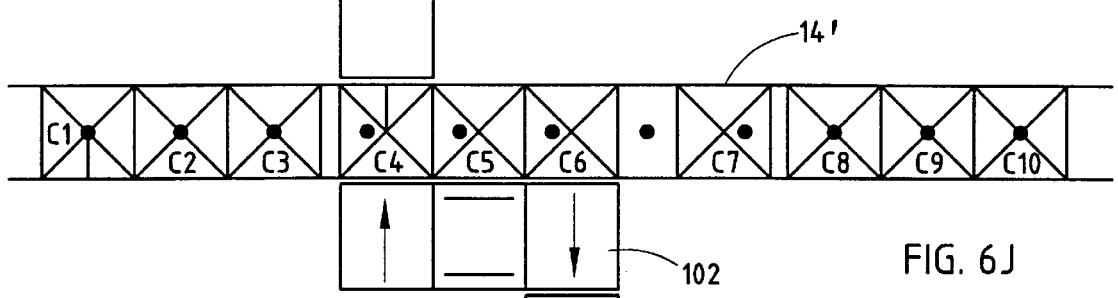
Figure 6K:
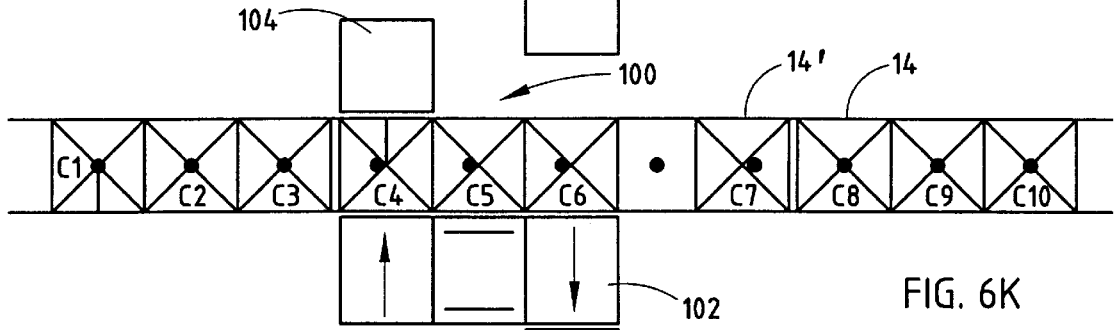
Figure 6L:
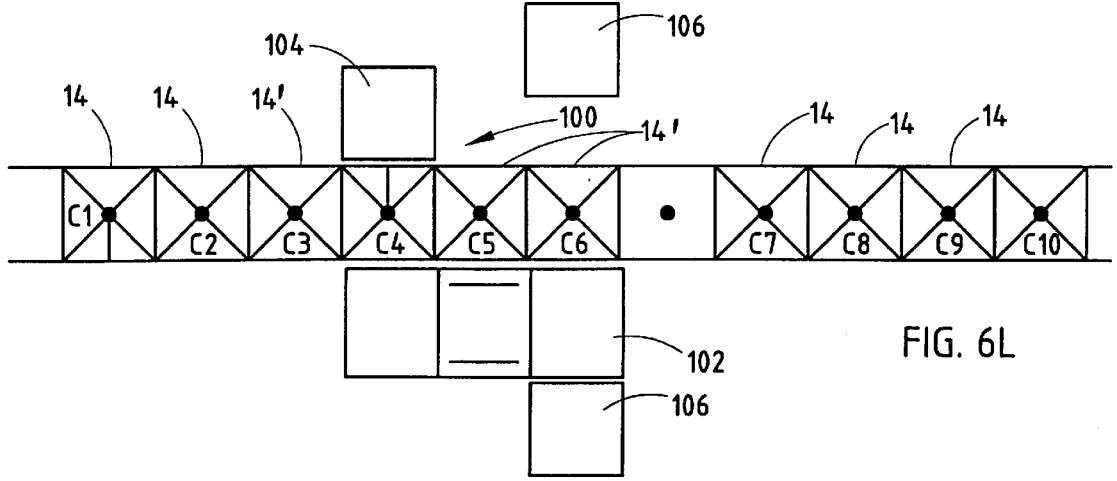

FIG. 6A illustrates the end of a loading and unloading cycle, where containers 40 have been transferred from decoupled storage column 14' (C5) to a lift assembly 102 by an ejection assembly 104 and have been transferred from lift assembly 102 to decoupled storage column 14' (C7) by an injection assembly 106. In FIGS. 6B–6D decoupled storage columns 14' (C4–C7) are advanced along the continuous path ahead of their respective coupler assemblies 16 (represented by dots "·" in FIGS. 6A–6L) until storage columns 14' (C4 and C6) are aligned with shelves 102a and 102b of lift assembly 102 and stopped by retractable stop 107 to begin the next loading and unloading cycle. At this point in time, decoupled storage column 14' (C7), having been unloaded of and loaded with containers, is ready to be recoupled to conveyor 12 by another coupler assembly 16.

As best shown in FIG. 5B, a second driver 108 moves decoupled storage column 14' (C7) past the distal end of abutment 80 adjacent the ramp up portion 62c of rail 18 so that the next upstream coupler assembly recouples storage column 14' (C7) to conveyor 12. Driver 108 may comprise a friction drive, a push drive, or a chain drive. When coupler assembly 16 is moved by conveyor 12 beyond the end of abutment 80, hook members 50 and 52 pivot about pin 58a to assume a generally vertical orientation and hooked portion 74 re-engages pin 68 of decoupled storage column 14' (C7). Referring to FIG. 5C, as coupler assembly 16 moves up ramp-up portion 62c of rail 18 hooked portion 74 rotates about pin 68 until hook members 50 and 52 are fully vertically oriented and coupler assembly 16 slides and lifts storage column 14'0 (C7) off support rail 64.

While decoupled storage column 14' (C7) is advanced along support 64 by driver 108 to recouple storage column 14' (C7) to coupler assembly 16, storage column 14 (C3) is driven by conveyor 12 toward offset portion 62 of rail 18. Preferably, as decoupled storage column 14' (C7) is being recoupled to conveyor 12, storage column 14 (C3) is being decoupled from its respective coupler assembly 16 and conveyor 12 in the same manner as described above. As a result, there are four decoupled storage columns 14' at any given time. It should be understood, however, that the number of decoupled storage columns can be varied depending on the lift assembly structure and whether unloading and loading is to be done at the same location. This process is a continuous process and only requires a total gap between all the storage columns (14 and 14'), at any given time, equal to the width of one storage column width, which is equal to the distance a storage column travels during the unloading and loading cycle of a storage column. It should be understood that in conventional continuously moving carousels a gap of this magnitude is required between each storage column.

Figure 11A:
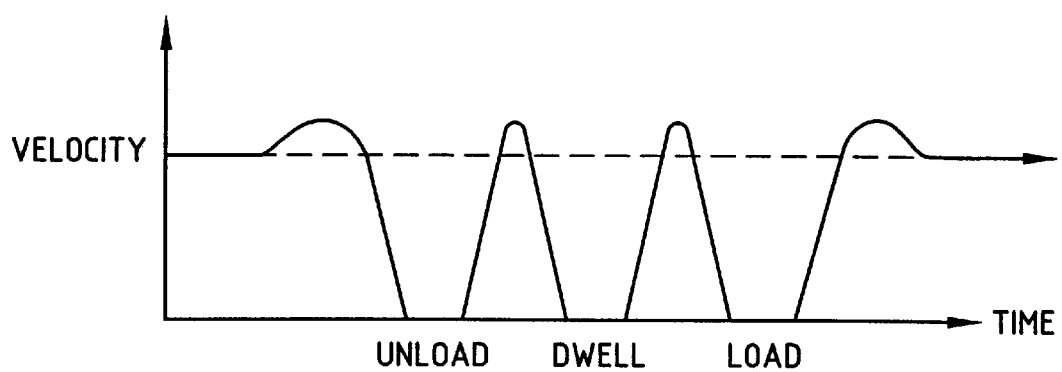
FIG. 11A–11C are possible graphical representations of the velocity of an individual storage column as it is moved through a container handling location.
Figure 11B:
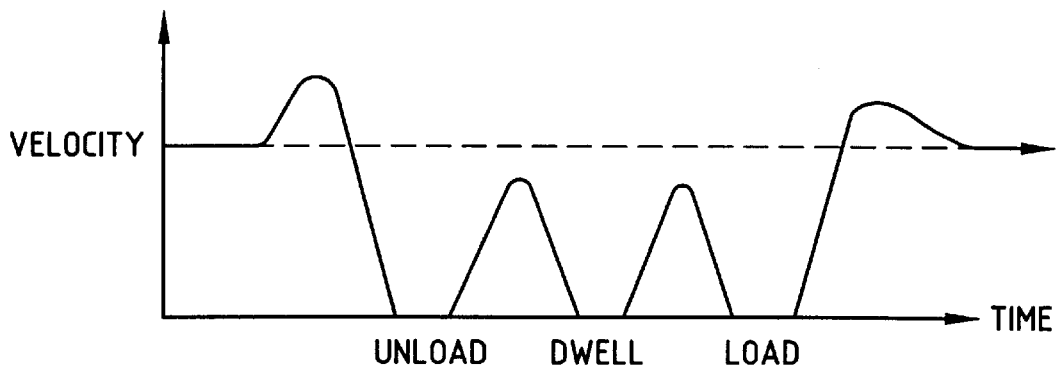

Referring to FIGS. 11A–11D, various cycles can be used to handle the decoupled storage columns 14'. Preferably, as previously described in reference to FIG. 5A–5C, once the storage column 14 is decoupled, driver 98 advances the decoupled storage column 14' along support rail 64 to container handling location 100. Moreover, decoupled storage column 14' is preferably stopped by retractable stop 107 when the decoupled storage column is aligned in the container handling location 100. As best seen in FIG. 11A, the speed of a storage column, as it approaches the container handling location, is relatively constant, for example, about 3 to 4 feet per minute (fpm). Most preferably, the speed of the coupled storage columns 14 is about 3.7 fpm. At this point, the storage column is still drivingly coupled to the continuously moving linkage 21. Once decoupled, the storage column is accelerated from about 3.7 fpm to about 4.1 fpm in 0.02 seconds and then de-accelerated to about 0 feet per minute in 0.05 seconds. The stationary storage column is unloaded over a period of approximately 2 to 3 seconds. After being unloaded, the storage column is again accelerated and de-accelerated to advance the unloaded storage column to a dwelling position, which is an intermediate position between the loading and unloading positions. This dwelling position allows the adjacent down-stream storage column to be unloaded and the adjacent up-stream storage column to be loaded. This intermediate position, however, is typically needed when the lift assembly includes an arrangement of continuously moving support shelves, for example, the lift assembly of the type disclosed in pending application entitled HIGH VOLUME CONVEYOR ACCUMULATOR FOR WAREHOUSE. After the adjacent down-stream column has been unloaded and the adjacent up-stream storage column has been loaded, the storage column is then accelerated and de-accelerated once again to advance the storage column to the loading position where it is held substantially stationary for a period of about 2 to 3 seconds. After loading, the storage column is then accelerated from about 0 fpm to 4.1 fpm in about 0.05 seconds until it is once again coupled to the driving linkage 21. As best seen in FIG. 11B, the relative magnitudes of the storage column's velocity during the several steps may be varied to achieve the same result.

Figure 11C:
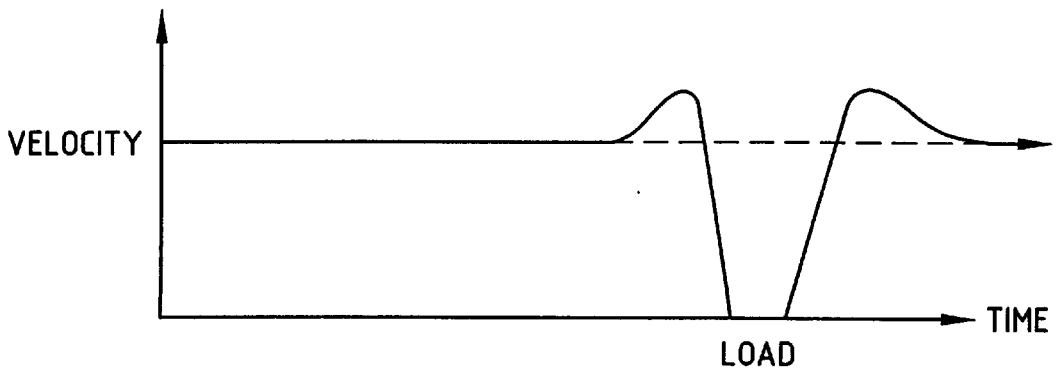

In the illustrated embodiment in FIGS. 6A–6L, the container handling location 100 includes a combined loading and unloading station where four storage columns are decoupled from driving chain linkage 21. If carousel 10 includes only one combined loading and unloading station, as described above, the spaces between each of the storage columns preferably total one storage column width. Where more than one combined loading and unloading station is desired, it should be understood that the spaces between the storage columns may total more than one storage column width. Furthermore, the loading and unloading may be separated so that there are two handling locations—a loading station and an unloading station. Moreover, the unloading station may be aligned with coupled storage columns 14 for unloading "on-the-fly", in which case the spaces between all the storage columns may total less than one storage column width. As best seen in FIG. 11C, where a single loading station is provided, a storage column again approaches the container handling location at a relatively constant speed, for example about 3 to 4 feet per minute. Again the storage column is accelerated and then de-accelerated and advanced along the support rail 64 until it is aligned with the loading device. In a similar manner, the decoupled storage column is held relatively stationary in the loading station for approximately 2 to 3 seconds. After loading, the storage column is accelerated to about 4.10 fpm in 0.05 seconds to recouple decoupled storage column to the linkage 21. This method reduces the number of stop-start cycles and possibly the complexity of the drives used to provide a gap. Moreover, this method increases the accuracy and reliability in the loading cycle or on the load stroke, which is not required during unloading.

Referring to FIG. 7, a second embodiment of carousel 110 is illustrated. Carousel 110 is of similar construction to carousel 10 and includes a plurality of storage carousels 114 that are each releasably coupled to a continuous drive linkage 121 of an overhead conveyor 112 by a coupler assembly 116. In this embodiment, coupler assembly 116 includes a pivotal member 144 having a hook portion 146 on one end for engaging a pin 168 of a respective storage column 114, as will be explained below, and a cam follower 148 on the other end to engage an anti-rotation rail 161. Coupler assembly 116 is guided on a track rail 118 and pivotally coupled to linkage 121 through a pin 150, which extends through a conventional link coupler, for example link couplers that are commercially available from Webb-Stiles. Track rail 118 is similar to track rail 18 and includes an offset track section with a down-ramp portion 162a, an intermediate portion 162b, and an up-ramp portion 162c.

Anti-rotation rail 161 similarly extends around the perimeter of conveyor 112 and also includes an offset rail section 163 with a down-ramp rail section 163a, an intermediate rail section 163b, and a ramp-up portion 162c. In this manner, anti-rotation rail 161 prevents pivotal member 144 from rotating in the clockwise direction but permits pivoted member 144 to rotate in the counter-clockwise direction when hook member disengages from column 114. In order to provide vertical support to storage column 114 when the storage carousel is decoupled from drive linkage 121, carousel 110 includes a support rail 164. Support rail 164 extends from a point before the down-ramp portion 162a of rail 118, across a container handling location 200, and beyond ramp-up portion 162c. Again, the length of the container handling location and the support rail depend on whether both loading and unloading cycles are desired at the same location and also depend on the equipment used to load and unload containers 40 from carousel 110.

As storage column 114 is driven around the continuous path and approaches ramp-down 162a, storage column 114 is guided onto support rail 164 by support flanges 165, which extend outwardly from an upper member 132 of column 114. Similar to support rail 64, support rail 164 preferably includes a low friction bearing surface, such as cam followers, rollers, bearings, or UHMW material (ultra high molecular weight). Support flanges 165 include sloping front and rear portions 165a to help guide storage column 114 onto support rail 164 as the respective storage column 114 is driven by driving linkage 121. Coupler assembly 116 is then lowered relative to the coupled storage column 114 by the ramp-down portion 162a of rail 118, which causes the hook portion 146 to disengage from pin 168 and storage column 114. Once disengaged, the decoupled storage column 114' is accelerated or advanced by a driver 198 on support rail 164. Driver 198 moves the decoupled storage column 114' up to or past the next coupler assembly, which causes the next coupler assembly to rotate in a counter-clockwise direction (FIG. 7). Driver 198 may be of similar construction to driver 98. The decoupled storage column 114' remains in its advanced position along support rail 164 until its associated coupler assembly 116 reaches the position of the decoupled storage column 114'. At which point the coupler assembly 116 re-engages pin 168 and is raised by ramp-up portion 162c of rail 118 to lift decoupled storage column 114' off support rail 164. Once recoupled, conveyor 112 drives the coupled storage column 114 around the continuous path of carousel 110. In the illustrated embodiment support rail 164 comprises a roller conveyor. It should be understood that support rail 164 may also comprise a structural beam with a low friction bearing surface or the like.

In a third embodiment, illustrated in FIG. 8, a coupler assembly 216 includes a pivotal member 244, which includes a hook portion 246 for engaging pin 268 of column 214 and a cam follower 248 for engaging and following an anti-rotation rail 261. In this embodiment anti-rotation rail 261 terminates before a container handling location 300 so that pivotal member 244 is free to rotate in either direction. As best seen in FIG. 8, when storage column 214 is moved by conveyor 212 to container handling location 300, coupler assembly 216 is similarly lowered by an offset track section 262 of track rail 218 while storage column 214 is driven onto a support rail 264. Once the coupler assembly 216 is lowered with respect to its associated storage column 214, its pivotal member 244 is rotated in the clockwise direction by a retractable stop 290.

Retractable stop 290 is extended into the path of the coupler assembly 216 only after storage column 214 is supported on support rail 264 and assembly 216 has been lowered with respect to storage column 214'. After pivotal member 244 is rotated, the decoupled storage column 214' is advanced by a driver 298 up to or past the next coupler assembly 216 where it can remain stationary for loading and or unloading. Again, reference is made to driver 98 for details of driver 298 since they are preferably of similar construction. Once loaded and/or unloaded, decoupled storage column 214' can be recoupled to its respective coupler assembly 216. To recouple the coupler assembly 216, the retractable stop 290 is retracted, which permits pivotal member 244 to rotate back to a generally vertical orientation to re-engage pin 268 of storage column 214. The recoupling is complete when the respective coupler is driven up the ramp-up portion (262c) of rail 218 so that storage column 214 is lifted off support 264.

Figure 9A:
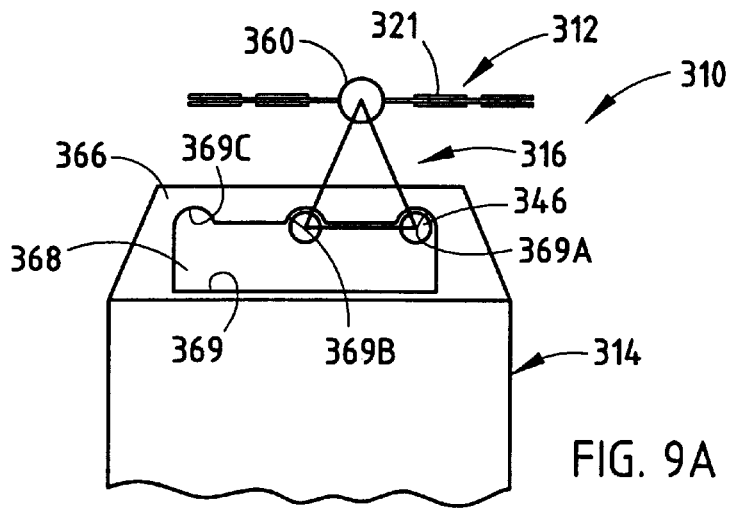
FIG. 9A–9C are partial front elevational views of a fourth embodiment of the coupler assembly illustrating the sequence of a storage column as it is temporarily drivingly decoupled and then recoupled to the conveyor.
Figure 9B:
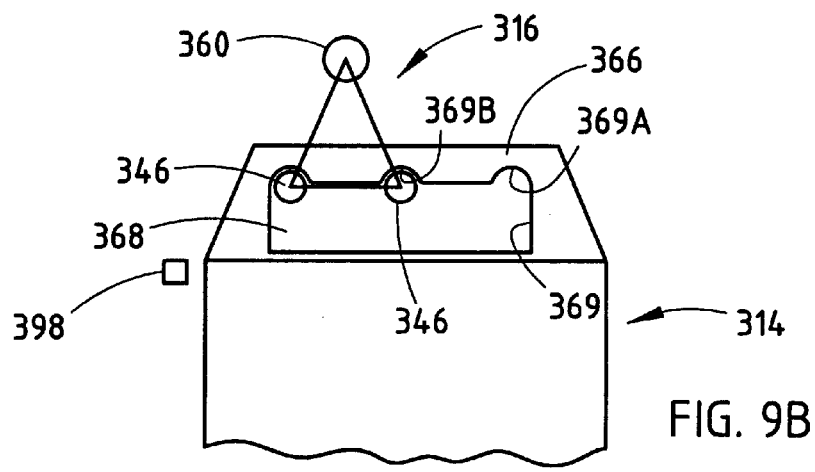
Figure 9C:
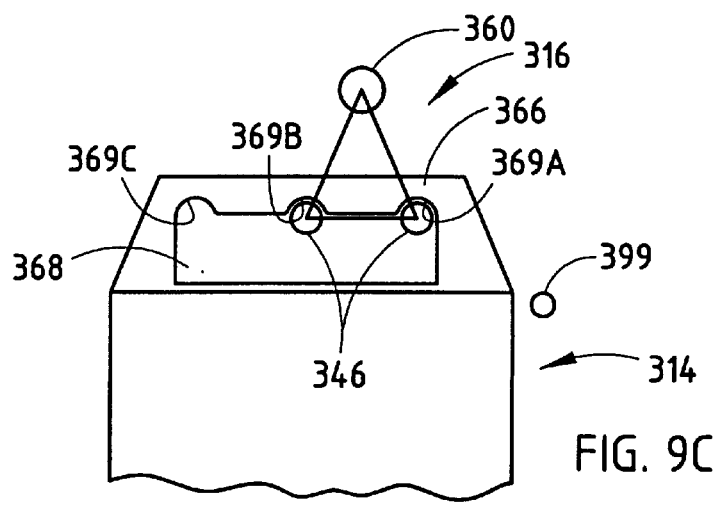

As best seen in FIGS. 9A–9C, a fourth embodiment of a coupler assembly 316 is shown in which a storage column 314 is supported on the coupler assembly 316 by an attachment bracket 366 between a driving position (FIG. 9A) and a holding position (FIG. 9B). Coupler assembly 316 includes a trolley member (not shown), which is of similar construction to trolley member 48 of the first embodiment. Like trolley member 48, the trolley member of coupler assembly 316 includes bearings for engaging and guiding storage column 314 on rail 18 (not shown in FIGS. 9A–9C). Furthermore, the trolley member of coupler assembly 316 includes a rigid link member 360 for coupling the trolley member to a driver linkage 321 of a conveyor 312. Again, rigid link member 360 is of similar construction to rigid link member 60 of the first embodiment. While details of rail 18 and the overhead conveyor frame are omitted in FIGS. 9A–9C, it should be understood that coupler assembly 316 engages rail 18 and is driven around the continuous loop of conveyor 312 in a similar manner as shown and described in reference to the first embodiment of carousel 10.

Referring to FIG. 9A, coupler assembly 316 also includes a pair of spaced apart bearing assemblies 346 on which storage column 314 is supported on coupler assembly 316. Storage column 314 is preferably of similar construction to storage column 14, with attachment plate bracket 366 extending from an upper member 332 of storage column 314. Attachment plate bracket 366 includes an enlarged opening 368, which receives bearing assemblies 346. The perimeter of opening 368 defines a bearing surface 369 on which bracket 366 rides on bearing assemblies 346. Preferably bearing surface 369 includes a plurality of recesses or notches 369a, 369b, 369c in which bearing assemblies 346 are seated. Recesses 369a, 369b, and 369c define at least two storage column positions: the driving position where storage column 314 is drivingly coupled to coupler assembly 316 and the holding position where storage column 314 may be drivingly decoupled from coupler assembly 316. Furthermore, recesses 369a, 369b, and 369c provide camming surfaces so that more than a nominal amount of force is required to move storage column 314 with respect to its coupler assembly 316.

Storage column 314 is temporarily drivingly decoupled from coupler assembly 316 by a driver 398 and a stop 399. Driver 398 advances storage column 316 on bearings 346 with respect to its respective coupler assembly 316 so that the storage column 314 may be temporarily slowed or halted in the holding position while the coupler assembly 316 continues to be moved by a driven conveyor 312. In this embodiment the storage column (314) is temporarily, drivingly decoupled from coupler assembly 316 so that storage column 314 is decoupled from the driving forces of conveyor 312.

As described above, the position of storage column 314 relative to its coupler assembly 314 is changed by storage column driver 398 and storage column stop 399. Storage column driver 398 is of similar construction to drive 98 and accelerates or advances storage column 314 on bearing assemblies 346 so that bearing assemblies 346 are moved from recesses 369a and 369b to recesses 369b and 369c (FIGS. 9A and 9B). When bearing assemblies are seated in recesses 369b and 369c, stop 399 holds the position of storage column 314 stationary while coupler assembly 316 is driven by conveyor 312 along the continuous path of carousel 310 (from left to right in FIGS. 9A–9C). Consequently, coupler assembly 316 moves with respect to storage column 314 and no longer drives storage column 314 until bearing assemblies are once again seated in recesses 369a and 369b. While storage column 314 is held stationary by stop 399, containers 40 may be loaded onto or unloaded from the storage column shelves 336 at container handling location 400. It should be understood that the width and separation of the notched recesses in combination with the speed of the conveyor determine the length of time that storage column 314 can be held stationary.

In yet another embodiment, illustrated in FIGS. 10A–10D, coupler assembly 416 includes a support member 446 on which a storage column 414 is supported. Similar to the previous embodiments, coupler assembly 416 includes a trolley member (not shown), which includes bearings (also not shown) for engaging and guiding storage column 414 on rail 18, and a rigid link member 460 for coupling the trolley member to the driver linkage 421 of an overhead conveyor 412. Again coupler 416 is illustrated in the context of how coupler assembly 416 couples its respective storage column 414 to driver linkage 421; therefore, details of rail 18 and the overhead conveyor frame are omitted. Instead, reference is made herein to the description and illustrations of the overhead conveyor of first embodiment of carousel 10.

Figure 10A:
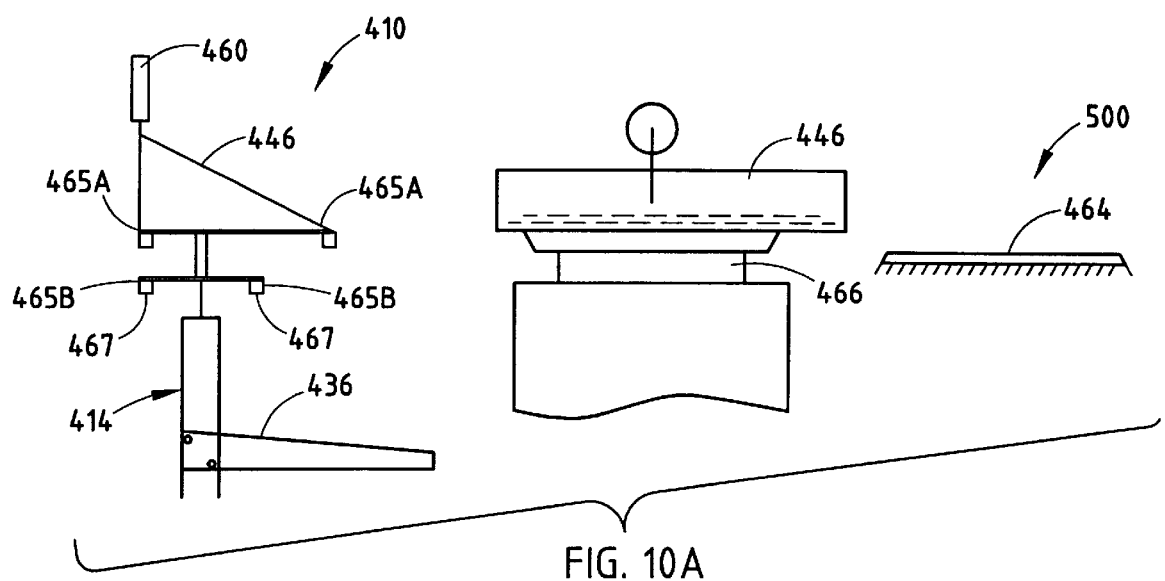
FIG. 10A–10D are partial front elevational views of a fifth embodiment of the coupler assembly illustrating the sequence of a storage column as it is temporarily drivingly decoupled and then recoupled to the conveyor.
Figure 10B:
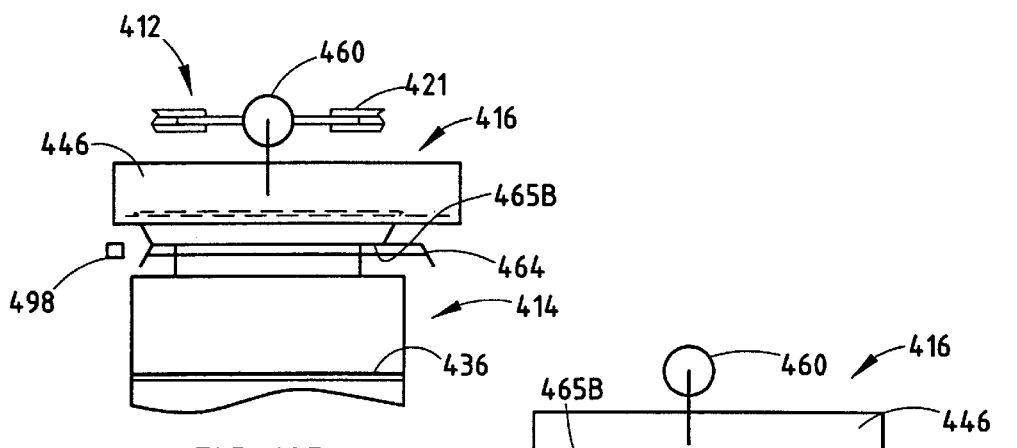
Figure 10C:
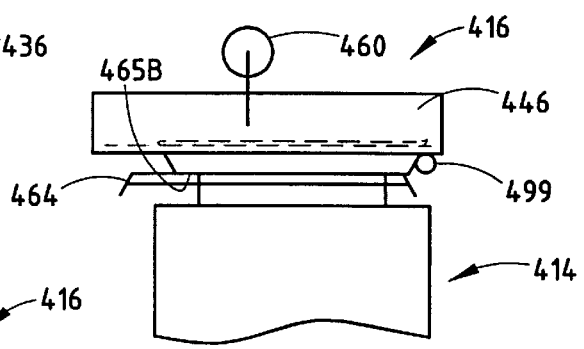
Figure 10D:
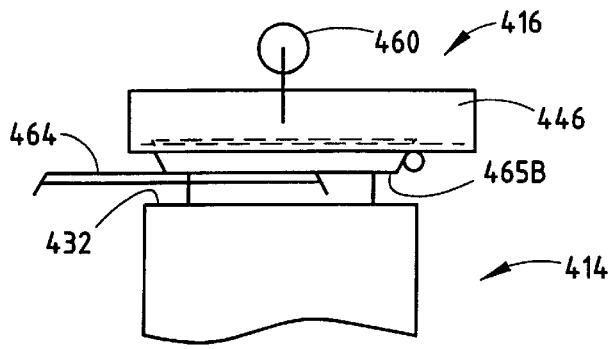

Support member 446 includes a horizontal extent along which a storage column 414 is adapted to translate in a similar manner to storage column 314 between a first, driving position (shown in FIG. 10A) to a second, holding position (shown in FIG. 10C). As best seen in FIG. 10A, storage column 414 includes an attachment member 466, which extends from an upper member 432 of storage column 414 to engage support member 446 of coupler assembly 416. Attachment member 466 preferably includes two sets of flanges 465a and 465b. Flanges 465a engage support member 446 and permit storage column 414 to slide along support member 446 from the first, driving position to the second, holding position.

As best seen in FIG. 10B, when storage column 414 is moved to container handling location 500, conveyor 412 drives storage column 414 onto a stationary support rail 464 on flanges 465b. Flanges 465b preferably include a low friction bearing surface 467, such as bearings, rollers, or UHMW material (ultra high molecular weight). Stationary support rail 464 provides vertical support for storage column 414 so that the frictional forces between flanges 465a of storage column 414 and coupler assembly 416 are reduced sufficiently to effectively temporarily, drivingly decouple storage column 414 from coupler assembly 416 and so that storage column can be advanced with respect to its associated coupler assembly 416. Furthermore, stationary support rail 464 may completely support storage column 414, thereby transferring all the weight of the storage column 414 from support member 446 and redirecting the weight to support rail 464 through flanges 465b to completely decouple storage column 414 from its respective coupler assembly 416.

As best seen in FIGS. 10B and 10C, once storage column 414 is drivingly decoupled from coupler assembly 416, a storage column driver 498 accelerates or advances storage column 414 along stationary support 464 to the second, holding position in coupler assembly 416. In this second, holding position, storage column 414 is temporarily held stationary or substantially stationary by a stop 499 so that storage column 414 can be loaded with containers or unloaded of containers using conventional pusher assemblies. Similar to the previous embodiment, stop 499 is retractable so that when coupler assembly 416, driven by conveyor 412, is returned to the first, driving position (FIG. 10C), stop 499 retracts to allow coupler 416 to slide storage column 414 off stationary support rail 464 and once again drive storage column 414 around the continuous path of carousel 410.

While reference has been made herein to several storage columns 14, 114, 214, 314, and 414, it should be understood that, except as otherwise noted, storage columns 114, 214, 314, and 414 are of similar construction to storage column 14. Similarly, the drive systems and conveyors 112, 212, 312, and 412 are also of similar construction to the conveyor 12 and drive system of carousel 10, except where noted otherwise. From the foregoing, it should also be understood that by reducing the total spacing between storage columns 14, 114, 214, 314, and 414 to a dimension that corresponds to the distance traveled by one storage column over the unloading or loading cycle of the carousel, the number of storage columns supported on carousels 10, 110, 210, 310, and 410 is maximized. While the number of storage columns of carousels 10, 110, 210, 310, and 410 approaches the number of storage columns on an indexing carousel, carousels 10, 110, 210, 310, and 410 do not expend the same amount of energy and do not experience the wear and tear associated with indexing carousels.

Although only a few embodiments of the present invention have been described herein, it should be understood that the present invention may be embodied in many other specific forms without departing from the scope or spirit of the invention. Particularly it should be noted that the releasable coupler described herein may be varied widely to accomplish the same functions in accordance with the invention. Furthermore, carousel 12 may include more than one delivery and retrieval area. Moreover, the delivery and retrieval areas may be located separately. In this manner, the number of storage columns that need to be decoupled and stopped per delivery or retrieval area can be reduced. In other applications, the storage columns may be individually driven or driven as a group by a driver that is independent of the overhead conveyor. In which case, the overhead conveyor may merely provide vertical support to the storage columns and provide a guide around which the storage columns are moved by the independent driver. Furthermore, vertical support for the storage columns may be provided by a lower or ground level track or rail. Therefore, the present examples and embodiments are to be considered as illustrative and not restrictive, and the invention is not to be limited to the details given herein, which may be modified within the scope of the appended claims.

We claim the exclusive property or privilege in the embodiments of the invention defined as:

1. An active high volume storage carousel comprising:
   a driven conveyor defining a continuous path, at least one container handling location provided along said continuous path; and
   a plurality of storage columns, each of said storage columns being coupled to said driven conveyor by a coupler, said driven conveyor moving said storage columns in said continuous path, and at least one of said storage columns being drivingly decoupled from said driven conveyor with a gap downstream of said at least one storage column when said at least one storage column is moved to said container handling location along said continuous path where containers are at least one of loaded onto and unloaded from said at least one storage column while said at least one storage column remains substantially in said continuous path.

2. An active high volume storage carousel according to claim 1, wherein said coupler of said at least one storage column temporarily decouples from said at least one storage column to define a decoupled storage column and thereby drivingly decouple said at least one storage column from said driven conveyor.

3. An active high volume storage carousel according to claim 2, wherein each of said couplers includes at least one pivotal member having a hook portion, said couplers engaging said storage columns with said hook portion, and said pivotal member of said at least one storage column pivoting to disengage from said at least one storage column when said at least one storage column is moved to said container handling location thereby defining a decoupled storage column.

4. An active high volume storage carousel according to claim 3, further comprising a decoupler, said decoupler pivoting said pivotal member of said coupler of said at least one storage column.

5. An active high volume storage carousel according to claim 2, further comprising a support, said support providing vertical support for said decoupled storage column.

6. An active high volume storage carousel according to claim 5, wherein said support comprises a rail having a low friction support surface.

7. An active high volume storage carousel according to claim 5, wherein said support comprises a conveyor.

8. An active high volume storage carousel according to claim 5, further comprising a storage column driver, said storage column driver advancing said decoupled storage column along said support to said container handling location to advance said decoupled storage column with respect to its associated coupler so that after said decoupled storage column has been loaded or unloaded with containers at said container handling location, said driven conveyor drives said associated coupler to reengage said decoupled storage column thereby recoupling said decoupled storage column to said driven conveyor.

9. An active high volume storage carousel according to claim 5, further comprising a first storage column driver and a second storage column driver, said first storage column driver advancing said decoupled storage column along said support to said container handling location for loading and unloading, said second driver advancing said decoupled storage column to a recoupling location on said support, and an upstream coupler being driven by said driven conveyor to said recoupling location to re-couple said decoupled storage column to said driven conveyor.

10. An active high volume storage carousel according to claim 1, wherein each of said couplers includes a hook member, said hook member of each of said couplers engaging its respective storage column, said hook members being pivoted when its respective storage column is moved to said container handling location to thereby decouple from its respective storage column.

11. An active high volume storage carousel according to claim 10, wherein at least one of said couplers pivots about said driven conveyor to disengage its hook member from its respective storage column when said respective storage column is moved to said container handling location to thereby decouple said at least one coupler from its respective storage column.

12. An active high volume storage carousel according to claim 11, further including an anti-rotation rail restraining said couplers from pivoting about said driven conveyor, said anti-rotation rail extending substantially around said continuous path and terminating in said container handling location such that when said storage column driver advances said respective storage column to said container handling location its respective coupler pivots about said driven conveyor to decouple from its respective storage column.

13. An active high volume storage carousel according to claim 12, wherein each of said couplers includes rollers for engaging said track rail.

14. An active high volume storage carousel according to claim 11, wherein said track rail includes a vertically offset track section, said offset track section including a ramp-down portion, an intermediate lower portion, and a ramp-up portion, said support extending along said vertically offset track section to support a respective storage column as its respective coupler is driven by said driven conveyor through said ramp-down portion thereby lowering said coupler relative to said respective storage column and disengaging said coupler from said respective storage column.

15. An active high volume storage carousel according to claim 1, further comprising:
a track rail extending around said continuous path, said storage columns being supported and guided on said track rail.

16. An active high volume storage carousel according to claim 1, wherein said at least one storage column is drivingly decoupled from said coupler of said at least one storage column to thereby drivingly decouple said at least one storage column from said driven conveyor.

17. An active high volume storage carousel according to claim 16, wherein each of said couplers includes a plurality of bearings, said bearings engaging said storage columns, and said at least one storage column advancing along said continuous path ahead of said coupler of said at least one storage column on said bearings when said at least one storage column is moved by said conveyor to said container handling location to thereby temporarily decouple said at least one storage column from said coupler of said at least one storage column.

18. An active high volume storage carousel according to claim 17, wherein said bearings comprise rollers.

19. An active high volume storage carousel according to claim 16, further comprising a storage column driver and a stop, said driver advancing said at least one storage column along said coupler to move said at least one storage column from a driving position to a holding position, and said stop temporarily holding said at least one storage column in said holding position while said coupler of said at least one storage column is being moved relative to said at least one storage column by said driven conveyor to thereby temporarily drivingly decouple said at least one storage column from said coupler of said at least one storage column.

20. An active high volume storage carousel according to claim 16, wherein each of said storage columns includes a bracket, said bracket of said at least one storage column being moved along said coupler when said at least one storage column is being drivingly decoupled from its respective coupler.

21. An active high volume storage carousel according to claim 16, further comprising a storage column driver and a stop, each of said couplers including a horizontal extent, said driver advancing at least one of said storage columns along said horizontal extent of its respective coupler from a first position to a second position when said at least one storage column is moved to said handling location, said stop holding said at least one storage column relatively stationary to define a stationary storage column while said coupler of said stationary storage column is being moved by said driven conveyor relative to said stationary storage column, and said stop releasing hold of said stationary storage column when said stationary storage column is returned to said first position.

22. An active high volume storage carousel according to claim 16, further comprising a storage column support, said driven conveyor moving said at least one storage column on said storage column support, said storage column support disengaging said at least one storage column from its respective coupler to thereby temporarily drivingly decouple said at least one storage column from said respective coupler.

23. An active high volume storage carousel according to claim 22, wherein said storage column support includes a low friction bearing support surface.

24. An active high volume storage carousel according to claim 22, wherein said storage columns each include flanges, said flanges of said at least one storage column supporting said at least one storage column on said storage column support.

25. An active high volume storage carousel according to claim 1, wherein each of said storage columns includes a plurality of vertically spaced shelves for storing the containers thereon.

26. An active high volume storage carousel according to claim 1, wherein said driven conveyor comprises a continuous chain, said continuous chain being driven by a pair of drive wheels.

27. An active high volume storage carousel according to claim 1, further comprising a decoupler, said decoupler temporarily decoupling a group of said storage columns when said group of storage columns is moved into said container handling location.

28. An active high volume storage carousel according to claim 1, each of said storage columns having a width and each of said storage columns being coupled to said conveyor at intervals approximately equal to the width of said storage columns to thereby maintain said storage columns in close proximity to each other.

29. The active high volume storage carousel according to claim 1, further comprising:
a decoupler temporarily decoupling a group of said storage columns from said driven conveyor at said container handling location, said group of storage columns being advanced along said continuous path ahead of their respective couplers and being substantially stationary in said handling location.

30. An active high volume storage carousel according to claim 29, further comprising a support positioned in said container handling location, said driven conveyor driving said group of storage columns onto said support so that said group of storage columns are supported while said decoupler decouples said group of storage columns from said driven conveyor.

31. An active high volume storage carousel according to claim 30, wherein said support comprises a rail, said driven conveyor moving said group of storage columns onto said rail when said storage column is moved to said container handling location.

32. An active high volume storage carousel according to claim 30, further comprising a storage column driver, said storage column driver advancing said group of storage columns along said support whereby said group of storage columns can remain relatively stationary during a container handling cycle and can be recoupled to said driven conveyor after said container handling cycle is complete.

33. An active high volume storage carousel according to claim 32, wherein the storage column of said group of storage columns are individually recoupled to said driven conveyor after being loaded with containers.

34. An active high volume storage carousel according to claim 30, said storage columns each including flanges for engaging said support.

35. An active high volume storage carousel according to claim 34, said flanges each including a low friction bearing surface for slidably engaging said support.

36. An active high volume storage carousel according to claim 29, wherein said driven conveyor is a continuously moving conveyor.

37. An active high volume storage carousel according to claim 29, wherein said storage columns are each coupled to said driven conveyor by a coupler, said decoupler temporarily, drivingly decoupling said couplers of said group of storage columns to thereby decouple said group of storage columns from said driven conveyor.

38. An active high volume storage carousel according to claim 29, wherein said storage columns each are coupled to said driven conveyor by a coupler, said decoupler comprising a retractable stop, said retractable stop disengaging said couplers from said group of storage columns to thereby decouple said group of storage column from said driven conveyor.

39. An active high volume storage carousel according to claim 38, wherein each of said couplers includes a pivotal member engaging said storage columns, said stop pivoting said pivotal member of each of said group of storage columns to thereby disengage said couplers of said group storage columns from said group of storage columns.

40. An active high volume storage carousel comprising:
a driven conveyor defining a continuous path, said continuous path including at least one container handling location;
a plurality of storage columns, each of said storage columns being coupled to said driven conveyor by a coupler, said driven conveyor moving said storage columns in said continuous path, and at least one of said storage columns being drivingly decoupled from said driven conveyor when said at least one storage column is moved to said container handling location; and
a driver advancing at least one respective storage column ahead of its respective coupler, said at least one respective storage column being positioned for at least one of loading and unloading of articles onto said respective storage column and subsequently recoupled with said driven conveyor.

41. The active high volume storage carousel according to claim 40, wherein each of said couplers includes at least one pivotal member, said couplers engaging said storage columns with said pivotal members, and said pivotal member of said at least one respective storage column pivoting to disengage from said at least one storage column when said at least one storage column is moved to said container handling location thereby defining a decoupled storage column.

42. The active high volume storage carousel according to claim 41, further comprising a decoupler, said decoupler pivoting said pivotal member of said coupler of said at least one respective storage column.

43. The active high volume storage carousel according to claim 41, further comprising a support, said support providing vertical support for said decoupled storage column.

44. The active high volume storage carousel according to claim 40, wherein said at least one respective storage column is one of slowed and halted for at least one of loading containers onto and unloading containers from said at least one respective storage column.

45. The active high volume storage carousel according to claim 40, wherein said driver comprises a first storage column driver, said active high volume storage carousel further comprising a second storage column driver, said second storage column driver advancing said at least one respective storage column after being one of slowed and halted for at least one of loading and unloading to a recoupling location where said respective storage column is recoupled with said driven conveyor.

46. An active high volume storage carousel comprising:
a driven conveyor defining a continuous path, said continuous path including at least one container handling location; and
a plurality of storage columns coupled to said driven conveyor in a side-by-side relationship, each of said storage columns being coupled to said driven conveyor by a coupler, said driven conveyor moving said storage columns in said continuous path, and at least one of said storage columns being drivingly decoupled from said driven conveyor with a gap downstream of said at least one storage column when said at least one storage column is moved to said at least one container handling location where said at least one storage column is at least one of loaded with or unloaded of articles, said at least one storage column being recoupled with said driven conveyor with a gap upstream of said at least one storage column when said at least one storage column is moved from said at least one container handling location.

47. The active high volume storage carousel according to claim 46, wherein said plurality of storage columns are coupled to said driven conveyor in a side-by-side relationship with a total gap between said storage columns not substantially exceeding an order of magnitude of one storage column width for each container handling location.

48. The active high volume storage carousel according to claim 40, further comprising a driver advancing said at least one storage column when said at least one storage column is moved to said container handling location.

49. The active high volume storage carousel according to claim 46, further comprising a second driver, said second driver advancing said at least one storage column to a recoupling location where said at least one storage column is recoupled to said driven conveyor after said at least one storage column is either loaded with or unloaded of articles.

50. The active high volume storage carousel according to claim 49, wherein each of said couplers includes at least one pivotal member, said couplers engaging said storage columns with said pivotal members, and said pivotal member of said at least one storage column pivoting to disengage from said at least one storage column when said at least one storage column is moved to said at least one container handling location thereby defining a decoupled storage column.

51. An active high volume storage carousel comprising:
a driven conveyor defining a continuous path, said continuous path including at least one container handling location;

a plurality of storage columns coupled to said driven conveyor in a side-by-side relationship, each of said storage columns being coupled to said driven conveyor by a coupler, said driven conveyor moving said storage columns in said continuous path, and at least one of said storage columns being drivingly decoupled from said driven conveyor with a gap downstream of said at least one storage column when said at least one storage column is moved to said at least one container handling location; and a lift assembly positioned in said container handler location and at least one of an injection assembly for at least one of loading containers onto said at least one storage column from said lift assembly and unloading containers from said at least one storage column onto said lift assembly, said at least one storage column being recoupled with said driven conveyor with a gap upstream of said at least one storage column when said at least one storage column is moved from said at least one container handling location.

52. The active high volume storage carousel according to claim 51, wherein said at least one storage column is one of slowed and halted in said container handling location.

53. The active high volume storage carousel according to claim 51, wherein said storage columns have a plurality of vertically spaced support shelves, said lift assembly having a plurality of article supports for supporting containers to be delivered to or to be received from said at least one storage column, said lift assembly raising and lowering said article supports to align selected article supports with selected shelves of said at least one storage column.

54. The active high volume storage carousel according to claim 53, wherein said article supports move upwardly in an article receiving portion of said lift assembly and downwardly in an article delivering portion of said lift assembly.

55. The active high volume storage carousel according to claim 54, wherein said lift assembly includes an article support driver defining a continuous path, said article supports coupled to said article support driver and moving in said continuous path to move between said article receiving portion and said article delivering portion.

56. The active high volume storage carousel according to claim 51, further comprising a first storage column driver and a second storage column driver, said first storage column driver advancing said group of storage columns for aligning with the one of the mechanical loading apparatus and the mechanical unloading apparatus, said second storage column driver advancing said upstream storage column for recoupling with said driven conveyor.

57. The active high volume storage carousel according to claim 51 wherein said plurality of storage columns are coupled to said driven conveyor in a side-by-side relationship with a total gap between said storage columns not substantially exceeding an order of magnitude of one storage column width for each container handling location.

* * * * *